US008468193B2

(12) United States Patent
Torno

(10) Patent No.: US 8,468,193 B2
(45) Date of Patent: Jun. 18, 2013

(54) BINARY NUMBER MULTIPLYING METHOD AND CIRCUIT

(75) Inventor: Daniel Torno, Orleans (FR)

(73) Assignee: S.A.R.L. Daniel Torno, Orleans (FR)

( * ) Notice: Subject to any disclaimer, the term of this patent is extended or adjusted under 35 U.S.C. 154(b) by 960 days.

(21) Appl. No.: 12/515,709

(22) PCT Filed: Mar. 15, 2007

(86) PCT No.: PCT/FR2007/000452
§ 371 (c)(1),
(2), (4) Date: Aug. 31, 2009

(87) PCT Pub. No.: WO2008/062106
PCT Pub. Date: May 29, 2008

(65) Prior Publication Data
US 2010/0017451 A1 Jan. 21, 2010

(30) Foreign Application Priority Data

Nov. 20, 2006 (FR) ...................................... 06 10142

(51) Int. Cl.
*G06F 7/52* (2006.01)
(52) U.S. Cl.
USPC ......................................... 708/625; 708/630
(58) Field of Classification Search
USPC ......................................... 708/625, 629, 630
See application file for complete search history.

(56) References Cited

U.S. PATENT DOCUMENTS

| 4,575,812 A | 3/1986 | Kloker et al. |
| 5,974,437 A * | 10/1999 | Johannsen ..................... 708/630 |
| 7,225,217 B2 * | 5/2007 | Willson et al. ................ 708/630 |
| 2006/0136541 A1 | 6/2006 | Hu |

FOREIGN PATENT DOCUMENTS

| EP | 1617324 A1 | 1/2006 |
| WO | 0034853 A1 | 6/2000 |

OTHER PUBLICATIONS

International Search Report for corresponding International Application No. PCT/FR2007/000452, filed Mar. 15, 2007.

* cited by examiner

*Primary Examiner* — Chuong D Ngo
(74) *Attorney, Agent, or Firm* — David D. Brush; Westman, Champlin & Kelly, P.A.

(57) ABSTRACT

A multiplier and a method multiply, using an array of adders, two binary numbers X and Y defining a matrix $[E_n^i = x_{n-i} \cdot y_i]$, wherein the initial matrix $[E_n^i = x_{n-i} \cdot y_i]$ is transformed into a matrix $[E_n^i = (x_{n-i} \oplus y_i) \cdot (y_{i-1} \oplus y_i) = (x_{n-i} \oplus y_i) \cdot Y_i]$ with $Y_i = y_{i-1} \oplus y_i$ or $[E_n^i = e_n^i \cdot Y_i]$ with $e_n^i = x_{n-i} \oplus y_i$. A first approximation $U_n^0$ and $R_{n-1}^{i-1}$ is formed of the sum and carry of the first two rows $y_0$ and $y_1$ of this matrix, and this is used as an input for the following estimation step which is repeated for all the following rows, successively carrying out the addition of the following $y_{i+1}$ rows up to the last non-zero row, according to a first given series of propagation equations, and then the propagation of the carries $R_n^{i-1}$ is carried out over the zero $y_{i+1}$ rows according to a second given series of propagation equations, in order to obtain the final result of the product P.

33 Claims, 8 Drawing Sheets $R_n^1$ propagation component $R_n^1$ refinement component $R_n^i$ propagation component $R_n^i$ refinement component

FIG. 2

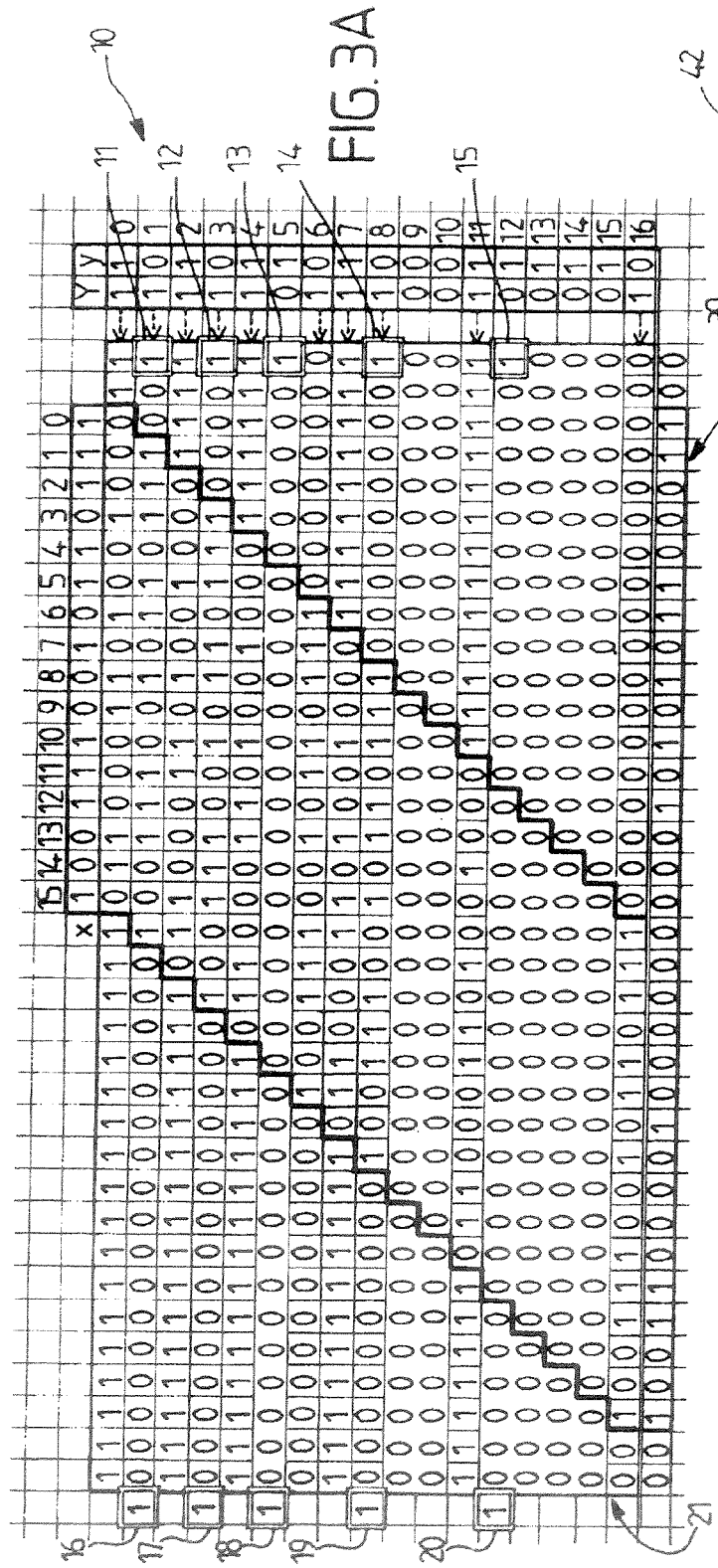

FIG. 3B

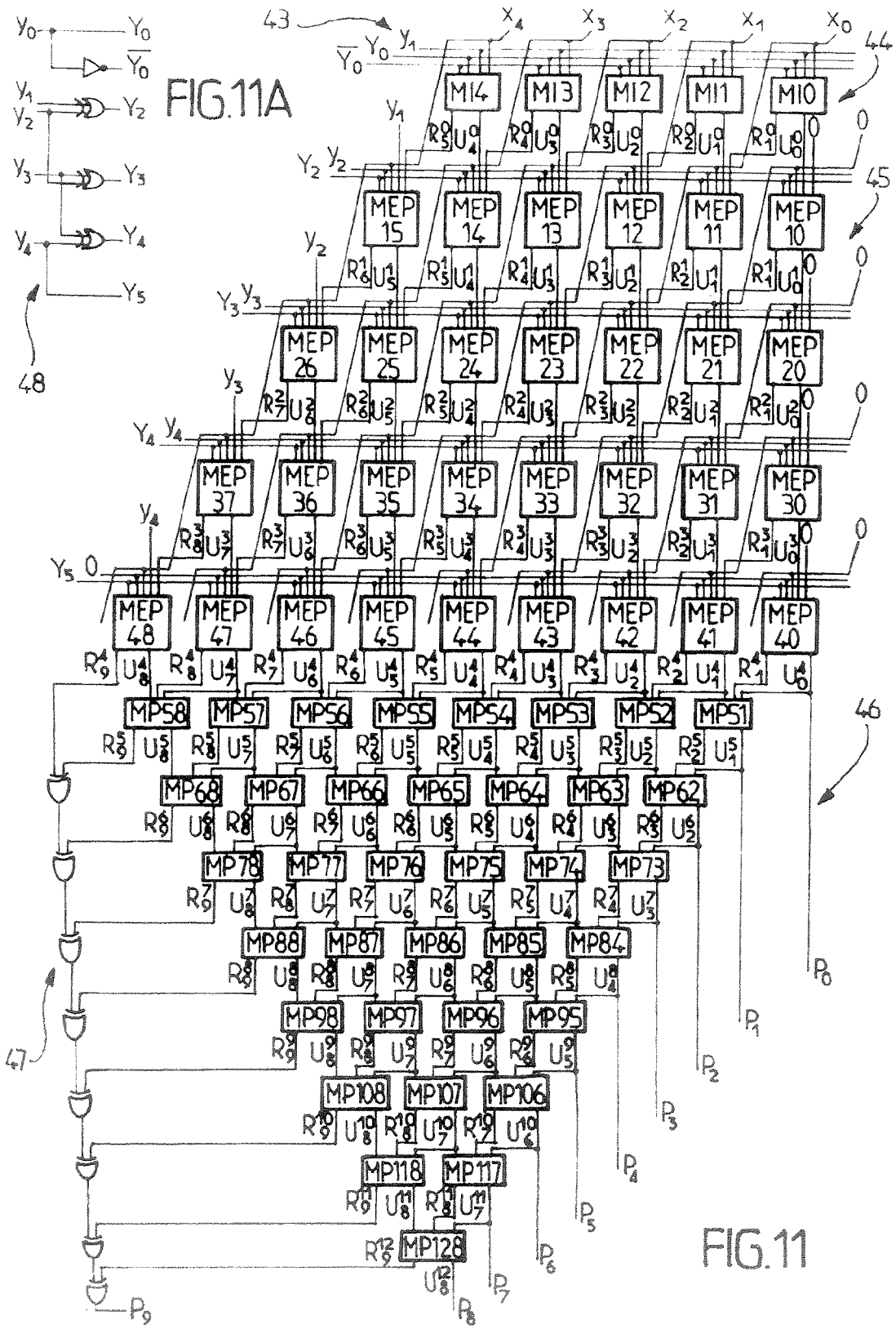

BINARY NUMBER MULTIPLYING METHOD AND CIRCUIT

CROSS-REFERENCE TO RELATED APPLICATIONS

This Application is a Section 371 National Stage Application of International Application No. PCT/FR2007/000452, filed Mar. 15, 2007 and published as WO 2008/062106 on May 29, 2008, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

This disclosure relates to a binary number multiplying method and circuit using an array of adders.

It finds a particularly important, although not exclusive, application in the field of computer systems implementing algorithms requiring many multiplications to be carried out quickly such as for example in the digital signal processing field.

It can therefore be used, more simply and more efficiently, instead of known multipliers implemented by coding or with counters.

BACKGROUND OF THE DISCLOSURE

Multipliers of the type based on a dot matrix scheme are already known.

Here the multiplicand is shifted, multiplied by a multiplier bit and added with the intermediate sum from the previous calculation.

The operation is then repeated to the last bit, addition of the shifted multiplicand values being performed either by coding using simplifying algorithms considering the successive elements as multiples, (coding of the type known by the name "Booth" coding), which makes it possible to reduce the number of multiplicands to be added, or by using an array of half-adders arranged as counters.

Such multipliers can however be further improved; this is because they prove to be expensive in terms of power and are also difficult to test beforehand perfectly reliably.

SUMMARY

An aspect of the disclosure starts with a new arrangement with successive approximations organised in three stages, which does not use the matrix generated by the known logical ANDs of multipliers and multiplicands, but the EXCLUSIVE OR, which is much easier to test.

With an embodiment of the invention, the calculation matrix is re-expressed in a different form, by transforming it so that it expresses the actual structure of the number sought.

With this aim, an embodiment of the invention essentially proposes a method for multiplying, using an array of adders, two binary numbers X and Y of N and M bits respectively, namely:

$$\begin{cases} X = x_N \cdot 2^N + x_{N-1} \cdot 2^{N-1} + \ldots + x_n \cdot 2^n + \ldots + x_1 \cdot 2^1 + x_0 \cdot 2^0 \\ Y = y_M \cdot 2^M + y_{M-1} \cdot 2^{M-1} + \ldots + y_n \cdot 2^n + \ldots + y_1 \cdot 2^1 + y_0 \cdot 2^0 \end{cases}$$

defining an initial matrix $[E_n^i = x_{n-i} \cdot y_i]$, characterised in that the initial matrix $[E_n^i = x_{n-i} \cdot y_i]$ is transformed into a matrix $[E_n^i = (x_{n-i} \oplus y_i) \cdot (y_{i-1} \oplus y_i) = (x_{n-i} \oplus y_i) \cdot Y_i]$ with $Y_i = y_{i-1} \oplus y_i$, or $[E_n^i = e_n^i \cdot Y_i]$ with $e_n^i = x_{n-i} \oplus y_i$, wherein the step of multiplying comprises:

forming a first approximation $U_n^0$ and $R_{n+1}^0$ of a sum and carry of the first two rows $y_0$ and $y_1$ of this matrix thus transformed over the entire length of said numbers, using this first approximation as an input for a following estimation step which is repeated for all the following rows, successively carrying out an addition of the following $y_{i+1}$ rows up to the last non-zero row, according to a first given series of propagation equations, carrying-out a propagation of the carries $R_n^{i-1}$ over the zero $Y_{i+1}$ rows according to a second given series of propagation equations, in order to obtain the final result of the product: $P = p_{M+N+1} \cdot 2^{M+N+1} + p_{M+N} \cdot 2^{M+N} + \ldots + p_n \cdot 2^n + \ldots + p_1 \cdot 2^1 + p_0 \cdot 2^0$ In advantageous embodiments, one and/or another of the following provisions are also used:

The first approximation of the bits of the sum $U_n^0$ is determined by performing a calculation using the signal corresponding to the value $E_n^0$ of the matrix corrected by the signal corresponding to the value $Y_1 = y_0 \oplus y_1$, and in that the first approximation of the bits of the carry $R_{n+i}^0$ is determined by performing a calculation using the signals corresponding to the values $E_{n-1}^0$ and $E_n^1$ of the matrix corrected by the signal corresponding to the value $Y_1 = y_0 \oplus y_1$;

The first approximation is given by the formula:

$$\begin{cases} U_n^0 = y_1 \oplus y_0 \cdot x_n \\ R_n^0 = y_1 \cdot \overline{y_0} \cdot x_{n-1} \end{cases}$$

called EI1;

By re-expressing it as a function of $Y_1, Y_0, E_n^0, E_{n-1}^0$ the first approximation is then given by the formulae:

$$\begin{cases} U_n^0 = Y_1 \oplus E_n^0 \\ R_n^0 = Y_1 \cdot (\overline{E_n^1 \oplus E_{n-1}^0}) \end{cases}$$

called E'I1 with the following carry look-ahead hypotheses: if the second row is not zero ($Y_1 = 1$), a carry is anticipated irrespective of the value of the first row ($Y_0 = 0$ or $Y_0 = 1$)

The first approximation is given by the formula:

$$\begin{cases} U_n^0 = y_1 \cdot y_0 \oplus y_0 \cdot x_n \\ R_n^0 = y_1 \cdot \overline{y_0} \cdot (x_{n-1} \oplus 1) \end{cases}$$

called EI2
with: $Y_0 = 0 \oplus y_0 = y_0$ and $Y_1 = y_0 \oplus y_1$;

By re-expressing it as a function of $Y_1, Y_0, E_n^0, E_{n-1}^0$, it becomes $$\begin{cases} U_n^0 = Y_1 \cdot Y_0 \oplus E_n^0 \\ R_n^0 = Y_1 \cdot (\overline{E_n^1 \oplus E_{n-1}^0}) \oplus Y_1 \cdot \overline{Y_0} \end{cases}$$

called E'I2 with the following carry look-ahead hypotheses: if the two rows are not zero ($Y_0=1$ and $Y_1=1$), a carry is anticipated;

The first approximation is given by the formula:

$$\begin{cases} U_n^0 = \overline{y_0} \oplus y_0 \cdot x_n \\ R_n^0 = \overline{y_1} \cdot \overline{y_0} \oplus y_1 \cdot x_{n-1} \end{cases}$$

called EI3;

By re-expressing it as a function of $Y_1, Y_0, E_n^0, E_{n-1}^0$ the first approximation is given by the formulae:

$$\begin{cases} U_n^0 = 1 \oplus E_n^0 \\ R_n^0 = (\overline{E_n^1 \oplus E_{n-1}^0}) \end{cases}$$

called E'I3 with the following carry look-ahead hypotheses: irrespective of the values of $Y_0$ and $Y_1$, a carry is anticipated;

The first approximation is given by the formula:

$$\begin{cases} U_n^0 = y_1 \cdot \overline{y_0} \oplus y_0 \cdot x_n \\ R_n^0 = y_1 \cdot x_{n-1} \end{cases}$$

called EI4;

The first approximation is given by the formula:

$$\begin{cases} U_n^0 = y_1 \oplus \overline{y_1} \cdot \overline{y_0} \oplus y_0 \cdot x_n \\ R_n^0 = \overline{y_1} \cdot \overline{y_0} \oplus y_1 \cdot \overline{y_0} \cdot x_{n-1} \end{cases}$$

called EI5;

The first approximation is given by the formula:

$$\begin{cases} U_n^0 = \overline{y_1} \cdot \overline{y_0} \oplus y_0 \cdot x_n \\ R_n^0 = \overline{y_0} \oplus y_1 \cdot x_{n-1} \end{cases}$$

called EI6;

The first approximation is given by the formula:

$$\begin{cases} U_n^0 = y_1 \cdot x_n \\ R_n^0 = y_1 \cdot \overline{y_0} \oplus y_1 \cdot x_{n-1} \end{cases}$$

called EI7;

The first approximation is given by the formula:

$$\begin{cases} U_n^0 = y_1 \oplus \overline{y_0} \oplus y_0 \cdot x_n \\ R_n^0 = \overline{y_0} \oplus y_1 \cdot \overline{y_0} \cdot x_{n-1} \end{cases}$$

called EI8;

The first series of equations is written:

$$\begin{cases} U_n^i = U_n^{i-1} \oplus R_n^{i-1} \oplus Y_{i+1} \\ R_{n+1}^i = (\overline{U_{n-1}^{i-1} \oplus R_{n-1}^{i-1} \oplus E_n^{i+1}}) \cdot Y_{i+1} \oplus (U_{n-1}^{i-1} \oplus U_{n-2}^{i-1}) \cdot R_{n-1}^{i-1} \end{cases}$$

called EEP1
with $E_n^{i+1} = (x_n \oplus y_{i+1}) \cdot Y_{i+1}$ and $Y_{i+1} = y_i \oplus y_{i+1}$;

The first series of equations is written $$\begin{cases} U_n^i = U_n^{i-1} \oplus R_n^{i-1} \oplus Y_{i+1} \\ R_{n+1}^i = Y_{i+1} \cdot \overline{R_n^{i-1}} \cdot (\overline{E_{n+1}^{i+1} \oplus U_n^{i-1}}) \oplus \overline{Y_{i+1}} \cdot R_n^{i-1} \cdot (U_n^{i-1} \oplus U_{n-1}^{i-1}) \end{cases}$$

called EEP2;
The first series of equations is written $$\begin{cases} U_n^i = U_n^{i-1} \oplus R_n^{i-1} \oplus Y_{i+1} \\ R_{n+1}^i = (Y_{i+1} \oplus R_n^{i-1}) \cdot (\overline{e_{n+1}^{i+1} \oplus U_n^{i-1}}) \end{cases}$$

called EEP3
with $e_{n+1}^{i+1} = x_{n-i} \oplus y_{i+1}$;
The second series of equations is written:

$$\begin{cases} U_n^i = U_n^{i-1} \oplus R_n^{i-1} \\ R_{n+1}^i = (U_n^{i-1} \oplus U_{n-1}^{i-1}) \cdot R_n^{i-1} \end{cases}$$

called EP1;
The second series of equations is written:

$$\begin{cases} U_n^i = U_n^{i-1} \oplus R_n^{i-1} \\ R_{n+1}^i = (\overline{e_{n+1}^{i+1} \oplus U_n^{i-1}}) \cdot R_n^{i-1} \end{cases}$$

called EP2;
The second series of equations is performed with Carry-Look-Ahead type adders.

An embodiment of the invention also proposes a multiplying system comprising calculation means implementing the above-mentioned method.

It also proposes more precisely a multiplier making it possible to multiply input signals comprising a first N-bit binary number (X) and a second M-bit binary number (Y), namely:

$$\begin{cases} X = x_N \cdot 2^N + x_{N-1} \cdot 2^{N-1} + \ldots + x_n \cdot 2^n + \ldots + x_1 \cdot 2^1 + x_0 \cdot 2^0 \\ Y = y_M \cdot 2^M + y_{M-1} \cdot 2^{M-1} + \ldots + y_n \cdot 2^n + \ldots + y_1 \cdot 2^1 + y_0 \cdot 2^0 \end{cases}$$

defining an initial matrix $[E_n^i = x_{n-i} \cdot y_i]$, wherein the multiplier comprises:

calculation means for transforming the initial matrix $[E_n^i = x_{n-i} \cdot y_i]$ into a matrix $[E_n^i = (x_{n-i} \oplus y_i) \cdot (y_{i-1} \oplus y_i) = (x_{n-i} \oplus y_i) \cdot Y_i]$ with $Y_i = y_{i-1} \oplus y_i$ or $[E_n^i = e_n^i \cdot Y_i]$ with $e_n^i = x_{n-i} \oplus y_i$, initial estimation module ($MEO_i$) arranged to provide a first approximation $U_n^0$ and $R_{n+1}^0$ of the sum and carry of the first two rows $y_0$ and $y_1$ over an entire length N of said numbers, comprising N estimation blocks ($MI_i$) connected in parallel, each estimation block being capable of performing said sums and said carries, an estimation/propagation module ($MEEP_i$) arranged to successively carry out the addition of the following $y_{i+1}$ rows up to the last non-zero row, according to a first given series of propagation equations, comprising estimation/propagation blocks ($MEP_i$) connected in cascade, each estimation/propagation block being capable of performing said sums and said carries, and a propagation module ($MP_i$), propagating the carries $R_n^{i-1}$ on the zero $y_{i+1}$ rows according to a second given series of propagation equations.

Advantageously, the means (MPi) of propagating the carries $R_n^{i-1}$ comprise estimation blocks in inverse cascade, each estimation block being capable of performing said carries.

Also advantageously and in order to speed up the operation of the means (Mpi) of propagating the carries $R_n^{i-1}$, a Carry-Look-Ahead type form of adder is used.

The disclosure will be better understood from a reading of the following description of embodiments given hereinafter for information only and non-limitatively.

BRIEF DESCRIPTION OF THE DRAWINGS

This refers to the accompanying figures, wherein:

Figure 2:
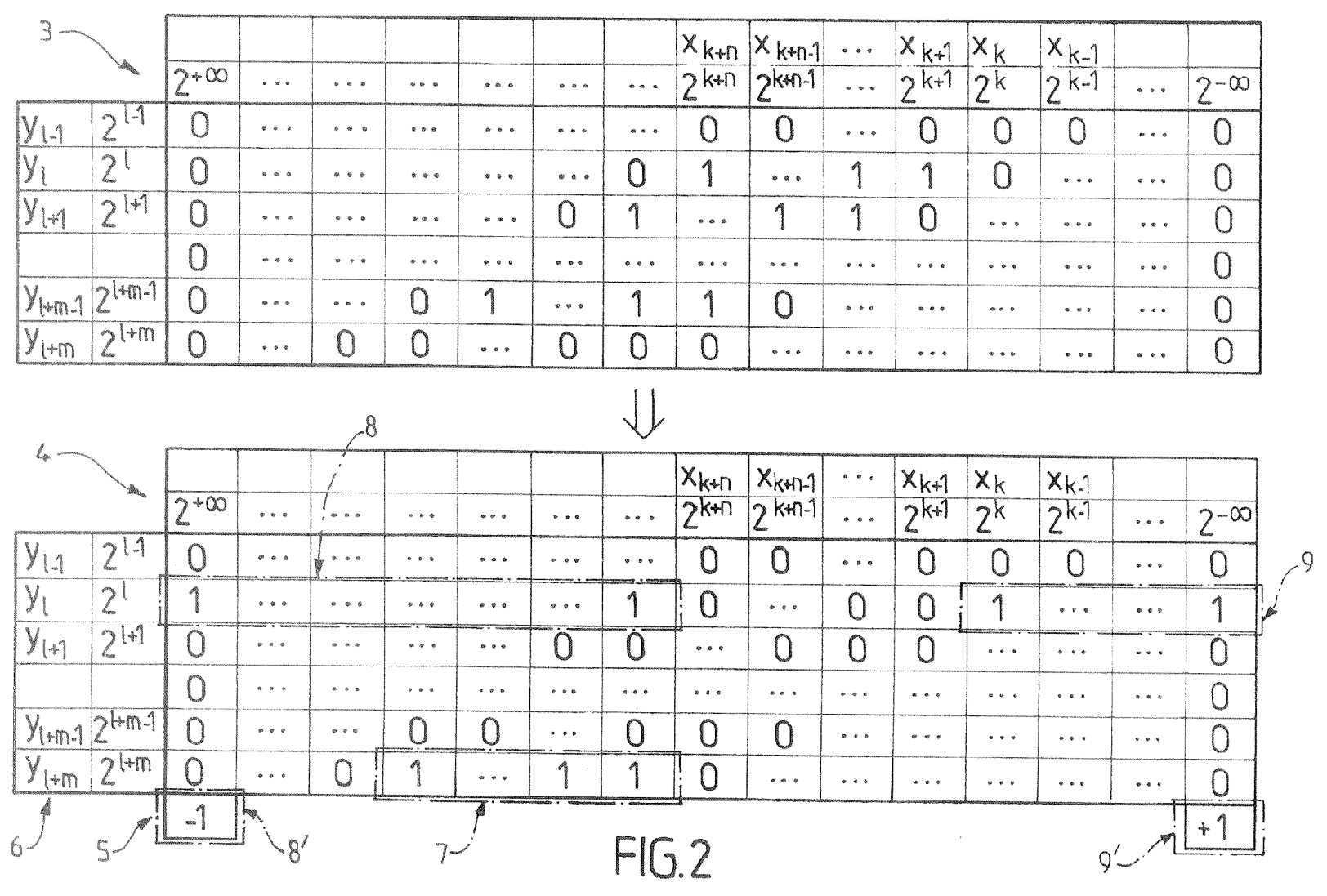

FIG. 2 shows the transformation of an expression of a known matrix of the type in FIG. 1, into a new matrix for use with an embodiment of the invention;

FIG. 3A shows an example matrix obtained according to the invention after transformation and FIG. 3B shows the values taken during successive iterations;

FIGS. 8 to 10 are example representations of logic circuits corresponding respectively to embodiments of the first approximation (EI1), the first series of equations (EEP3) and the second series of equations (EP1);

FIG. 11 is a general diagram of a multiplier according to an embodiment of the invention more particularly described here, with a detail (FIG. 11A);

DETAILED DESCRIPTION OF ILLUSTRATIVE EMBODIMENTS

Figure 1:
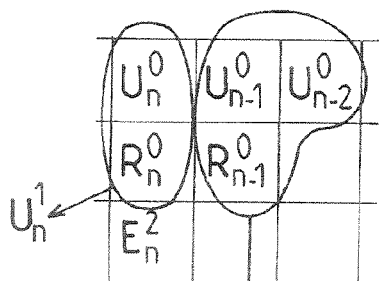
FIG. 1 shows the initial calculation matrix of a 5×5-bit multiplier.

FIG. 1 shows the initial calculation matrix for the multiplication of two binary numbers of five bits each, namely:

$$\begin{cases} X = x_4 \cdot 2^4 + x_3 \cdot 2^3 + x_2 \cdot 2^2 + x_1 \cdot 2^1 + x_0 \cdot 2^0 \\ Y = y_4 \cdot 2^4 + y_3 \cdot 2^3 + y_2 \cdot 2^2 + y_1 \cdot 2^1 + y_0 \cdot 2^0 \end{cases}$$

The product will therefore be expressed in 10 bits:

$P = p_9 \cdot 2^9 + p_8 \cdot 2^8 + \ldots + p_1 \cdot 2^1 + p_0 \cdot 2^0$ (see row 1 of FIG. 1).

For the known form the values $E_n^i$ are furthermore such that $E_n^i = x_{n-i} \cdot y_i$ and the values $E_n^i$ outside the hatched area 2 of FIG. 1 are zero.

According to an embodiment of the invention, a new expression of this initial matrix is used with values $E_n^i$ such that:

$$E_n^i = (x_{n-i} \oplus y_i) \cdot (y_{i-1} \oplus y_i) = (x_{n-1} \oplus y_i) \cdot Y_i$$

with $Y_i = y_{i-1} \oplus y_i$ or $E_n^i = e_n^i \cdot Y_i$ with $e_n^i = x_{n-i} \oplus y_i$.

The equivalence between the two forms of matrix {the known form (referenced 3 in FIG. 2) and that used with an embodiment of the invention, referenced 4 in FIG. 2)} is shown hereinafter with reference to said FIG. 2.

It has already been noted that the new matrix 4 has a row 5 more than the standard matrix 3 (with $E_n^i = x_{n-i} \cdot y_i$), since the last row 6 of this matrix 4 contains the values: $E_n^5 = (x_{n-5} \oplus y_5) \cdot Y_5 = x_{n-5} \cdot Y_5$ and $Y_5 = y_4 \oplus y_5 = y_4$ which can therefore be non-zero.

More precisely, the known matrix expressed as a function of $E_n^i = x_{n-i} \cdot y_i$ is transformed into a new matrix expressed as a function of $E_n^i = (x_{n-i} \oplus y_i) \cdot (y_{i-1} \oplus y_i)$ by re-expression of the sets of bits at 1 of the known matrix.

This transformation is done on the basis of the following considerations.

Let there be a set of bits having the value 1. This set is generated by the bits $x_k$ to $x_{k+n-1}$ having the value 1 multiplied by the bits $y_1$ to $y_{1+m-1}$ having the value 1. The result S is expressed thus:

$$S = (x_{k+n-1} \cdot 2^{k+n-1} + \ldots + x_{k+1} \cdot 2^{k+1} + x_k \cdot 2^k) \cdot (y_{1+\omega-1} \cdot 2^{i+m-1} + \ldots + y_{i+1} \cdot 2^{i+1} + y_i \cdot 2^i)$$

By assigning the values $x_i = 1$, $y_i = 1$ and factorising $2^k$ and $2^i$, it becomes:

$$S = 2^{k+i} \cdot (2^{n-1} + \ldots + 2^1 + 2^0) \cdot (2^{m-1} + \ldots + 2^1 + 2^0)$$

$$S = 2^{k+i} \cdot (2^n - 2^0) \cdot (2^m - 2^0) = 2^{k+i} \cdot (2^{n+m} - 2^m - 2^n + 2^0)$$

$$S = 2^{k+i} \cdot [(2^{n+m} - 2^m) + (2^{+\infty} - 2^n - 2^{\infty}) + (2^0 - 2^{-\infty} + 2^{-\infty})]$$

$$S = 2^{k+i} \cdot (2^{n+m} - 2^m) + (2^{+\infty} - 2^{k+1+n} - 2^{+\infty}) + (2^{k+1} - 2^{-\infty} + 2^{-\infty})$$

with:

$2^{k+i} \cdot (2^{n+m} - 2^m)$: portion referenced 7 in dot-and-dash lines in FIG. 2;

$(2^{+\infty} - 2^{k+1+n} - 2^{+\infty})$: portion referenced 8 and 8' in FIG. 2 in dot-and-dash lines;

$(2^{k+1} - 2^{-\infty} + 2^{-\infty})$: portion referenced 9 and 9' in FIG. 2 in dot-and-dash lines.

Thus and in a numerical example with a multiplier y=63669=1111100010110101 and a multiplicand x=40119=1001110010110111 the initial matrix is expressed according to Table I below.

TABLE I

|   |   |   |   |   |   |   |   |   |   |   |   |   |   |   |   |   |   |   |   |   |   |   |   |   |   |   |   |   |   |   |   |   |   |
|---|---|---|---|---|---|---|---|---|---|---|---|---|---|---|---|---|---|---|---|---|---|---|---|---|---|---|---|---|---|---|---|---|---|
|   |   |   |   |   |   |   |   |   |   |   |   |   |   |   |   | 1 | 0 | 0 | 1 | 1 | 1 | 0 | 0 | 1 | 0 | 1 | 1 | 0 | 1 | 1 | 1 | <-- | 1 |
|   |   |   |   |   |   |   |   |   |   |   |   |   |   |   | 0 | 0 | 0 | 0 | 0 | 0 | 0 | 0 | 0 | 0 | 0 | 0 | 0 | 0 | 0 | 0 |   | <-- | 0 |
|   |   |   |   |   |   |   |   |   |   |   |   |   |   | 1 | 0 | 0 | 1 | 1 | 1 | 0 | 0 | 1 | 0 | 1 | 1 | 0 | 1 | 1 | 1 |   |   | <-- | 1 |
|   |   |   |   |   |   |   |   |   |   |   |   |   | 0 | 0 | 0 | 0 | 0 | 0 | 0 | 0 | 0 | 0 | 0 | 0 | 0 | 0 | 0 |   |   |   |   | <-- | 0 |
|   |   |   |   |   |   |   |   |   |   |   |   | 1 | 0 | 0 | 1 | 1 | 1 | 0 | 0 | 1 | 0 | 1 | 1 | 0 | 1 | 1 | 1 |   |   |   |   | <-- | 1 |
|   |   |   |   |   |   |   |   |   |   |   | 1 | 0 | 0 | 1 | 1 | 1 | 0 | 0 | 1 | 0 | 1 | 1 | 0 | 1 | 1 | 1 |   |   |   |   |   | <-- | 1 |
|   |   |   |   |   |   |   |   |   |   | 0 | 0 | 0 | 0 | 0 | 0 | 0 | 0 | 0 | 0 | 0 | 0 | 0 | 0 | 0 | 0 |   |   |   |   |   |   | <-- | 0 |
|   |   |   |   |   |   |   |   |   | 1 | 0 | 0 | 1 | 1 | 1 | 0 | 0 | 1 | 0 | 1 | 1 | 0 | 1 | 1 | 1 |   |   |   |   |   |   |   | <-- | 1 |
|   |   |   |   |   |   |   |   | 0 | 0 | 0 | 0 | 0 | 0 | 0 | 0 | 0 | 0 | 0 | 0 | 0 | 0 | 0 | 0 |   |   |   |   |   |   |   |   | <-- | 0 |
|   |   |   |   |   |   |   | 0 | 0 | 0 | 0 | 0 | 0 | 0 | 0 | 0 | 0 | 0 | 0 | 0 | 0 | 0 | 0 |   |   |   |   |   |   |   |   |   | <-- | 0 |
|   |   |   |   |   |   | 0 | 0 | 0 | 0 | 0 | 0 | 0 | 0 | 0 | 0 | 0 | 0 | 0 | 0 | 0 | 0 |   |   |   |   |   |   |   |   |   |   | <-- | 0 |
|   |   |   |   |   | 1 | 0 | 0 | 1 | 1 | 1 | 0 | 0 | 1 | 0 | 1 | 1 | 0 | 1 | 1 | 1 |   |   |   |   |   |   |   |   |   |   |   | <-- | 1 |
|   |   |   |   | 1 | 0 | 0 | 1 | 1 | 1 | 0 | 0 | 1 | 0 | 1 | 1 | 0 | 1 | 1 | 1 |   |   |   |   |   |   |   |   |   |   |   |   | <-- | 1 |
|   |   |   | 1 | 0 | 0 | 1 | 1 | 1 | 0 | 0 | 1 | 0 | 1 | 1 | 0 | 1 | 1 | 1 |   |   |   |   |   |   |   |   |   |   |   |   |   | <-- | 1 |
|   |   | 1 | 0 | 0 | 1 | 1 | 1 | 0 | 0 | 1 | 0 | 1 | 1 | 0 | 1 | 1 | 1 |   |   |   |   |   |   |   |   |   |   |   |   |   |   | <-- | 1 |
|   | 1 | 0 | 0 | 1 | 1 | 1 | 0 | 0 | 1 | 0 | 1 | 1 | 0 | 1 | 1 | 1 |   |   |   |   |   |   |   |   |   |   |   |   |   |   |   | <-- | 1 |
| Product = | 1 | 0 | 0 | 1 | 1 | 1 | 0 | 0 | 0 | 1 | 0 | 0 | 0 | 0 | 0 | 0 | 0 | 0 | 0 | 1 | 0 | 1 | 0 | 1 | 0 | 1 | 1 | 0 | 0 | 0 | 1 | 1 |   |
| Product = | 2554336611 to the base 10 |

Multiplier = 63669 = 1111100010110101
Multiplicand = 40119 = 1001110010110111

And after transformation according to an embodiment of the invention, the matrix 10 of FIG. 3A is obtained.

Bits 11, 12, 13, 14 and 15 surrounded by a double frame represent the $2^{\infty}$ values and bits 16, 17, 18, 19 and 20 the $2^{+\infty}$ values.

It should therefore be noted that an additional row 21 is necessary for the matrix transformed into $2^{1+m}$.

It can also be seen that, in the multiplication described, it is not necessary to add the $2^{-\infty}$ values since it is carried out with adders that always assume a carry.

Neither is it necessary to propagate the carries beyond the parallelogram for the same reason.

There will now be described in greater detail the principle of the multiplication (applied to the above numerical example) implemented in the embodiment of the invention more particularly described here, with reference to FIG. 3B, the formula E'I1 for the first approximation, the formula EEP1 for the first series of equations and the formula EP1 for the second series of equations.

First of all the first approximation $U_n^0$ and $R_{n+1}^0$ of the sum of the first 2 rows of the matrix is calculated.

Let $E_0^0$ to $E_9^0$ and $E_0^1$ to $E_9^1$ be the rows to be added:
If the row $E_0^1$ to $E_9^1$ is zero (i.e. $Y_1 = y_0 \oplus y_1 = 0$), then $U_n^0 = E_n^0$;
If the row $E_0^1$ to $E_9^1$ is not zero, an initial estimate of the sum is: $U_n^0 = \overline{E_n^0}$.
The estimate is: $U_n^0 = \overline{Y_1} \cdot E_n^0 \oplus Y_1 \cdot \overline{E_n^0}$ that is: $U_n^0 = Y_1 \oplus E_n^0$.

As regards the refinement in n, this is:
If the row is zero ($Y_1 = 0$), $R_n^0 = 0$;
If the row is not zero, $R_n^0 = \overline{E_n^1 \oplus E_{n-1}^0}$.
The refinement is therefore: $R_n^0 = Y_1 \cdot (\overline{E_n^1 \oplus E_{n-1}^0})$.

At the next row (row 23 in FIG. 3B), the row $E_0^2$ to $E_9^2$ is added to the rows $U_0^0$ to $U_9^0$ and $R_0^0$ to $R_9^0$ in order to estimate $U_0^1$ to $U_9^1$ and $R_0^1$ to $R_9^1$.

If row 23 is zero ($Y_2 = 0$, $E_0^2$ to $E_9^2 = 0$), it is necessary to correct the initial estimates and propagate the refinements thus:

$$\begin{cases} U_n^1 = U_n^0 \oplus R_n^0 \\ R_n^1 = (U_{n-1}^0 \oplus U_{n-2}^0) \cdot R_{n-1}^0 \end{cases}$$

Figure 4:
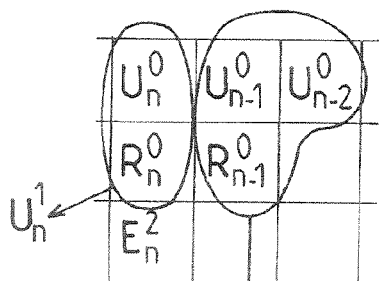
FIGS. 4 to 7 show graphically, by way of example, the development and operation of the first series of equations.

This algorithm is shown by FIG. 4.
Here, $R_n^1$ comprises only one propagation component.

If row 25 is not zero ($Y_2 = 1$), the initial estimates are corrected (calculation of $U_n^0 \oplus R_n^0$) and a new estimate $U_n^1$ is generated using this corrected value: $U_n^1 = \overline{U_n^0 \oplus R_n^0}$.

An $R_n^1$ refinement component is calculated with the corrected value $(U_{n-1}^0 \oplus R_{n-1}^0)$ and $E_n^2$ such that $R_n^1 = \overline{E_n^2 \oplus (U_{n-1}^0 \oplus R_{n-1}^0)}$.

Figure 5:
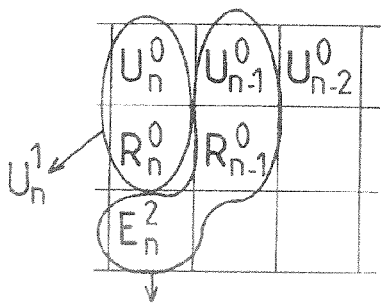
Figure 6:
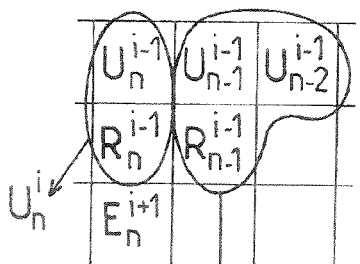

This is shown in FIG. 5.

For this case also it is necessary to generate the propagation component $(U_{n-1}^0 \oplus U_{n-2}^0) \cdot R_{n-1}^0$. Synthesis of the two cases ($Y_2 = 0$ and $Y_2 = 1$) gives the following formulae:

$$\begin{cases} U_n^1 = \overline{Y_2} \cdot [U_n^0 \oplus R_n^0] \oplus Y_2 \cdot [\overline{U_n^0 \oplus R_n^0}] \\ R_n^1 = \overline{Y_2} \cdot [(U_{n-1}^0 \oplus U_{n-2}^0) \cdot R_{n-1}^0] \oplus Y_2 \cdot \begin{bmatrix} \overline{E_n^2 \oplus (U_{n-1}^0 \oplus R_{n-1}^0)} \oplus \\ (U_{n-1}^0 \oplus U_{n-2}^0) \cdot R_{n-1}^0 \end{bmatrix} \end{cases}$$

That is after simplification:

$$\begin{cases} U_n^1 = U_n^0 \oplus R_n^0 \oplus Y_2 \\ R_n^1 = Y_2 \cdot [\overline{E_n^2 \oplus (U_{n-1}^0 \oplus R_{n-1}^0)}] \oplus (U_{n-1}^0 \oplus U_{n-2}^0) \cdot R_{n-1}^0 \end{cases}$$

For the following rows 24 to 37, the previous formulae are generalised.

If row (i+1) is zero $(Y_{i+1} = 0, E_0^i$ to $E_9^i = 0)$, $$\begin{cases} U_n^i = U_n^{i-1} \oplus R_n^{i-1} \\ R_n^i = (U_{n-1}^{i-1} \oplus U_{n-2}^{i-1}) \cdot R_{n-1}^{i-1} \end{cases}$$

If row (i+1) is not zero ($Y_{i+1} = 1$), $$\begin{cases} U_n^i = \overline{U_n^{i-1} \oplus R_n^{i-1}} \\ R_n^i = \overline{E_n^{i+1} \oplus (U_{n-1}^{i-1} \oplus R_{n-1}^{i-1})} \oplus (U_{n-1}^{i-1} \oplus U_{n-2}^{i-1}) \cdot R_{n-1}^{i-1} \end{cases}$$

Figure 7:
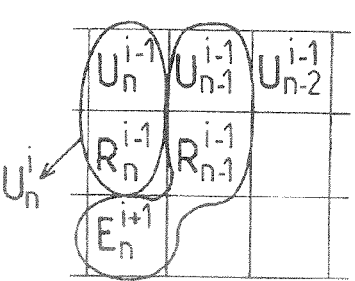

(See FIG. 7).

Synthesis of the two cases ($Y_{i+1}=0$ and $Y_{i+1}=1$) then gives the following formulae:

$$\begin{cases} U_n^i = \overline{Y_{i+1}} \cdot [U_n^{i-1} \oplus R_n^{i-1}] \oplus Y_{i+1} \cdot [\overline{U_n^{i-1} \oplus R_n^{i-1}}] \\ R_n^i = \overline{Y_{i+1}} \cdot [(U_{n-1}^{i-1} \oplus U_{n-2}^{i-1}) \cdot R_{n-1}^{i-1}] \oplus Y_{i+1} \cdot \begin{bmatrix} \overline{E_n^{i+1} \oplus (U_{n-1}^{i-1} \oplus R_{n-1}^{i-1})} \oplus \\ (U_{n-1}^{i-1} \oplus U_{n-2}^{i-1}) \cdot R_{n-1}^{i-1} \end{bmatrix} \end{cases}$$

That is after simplification:

$$\begin{cases} U_n^i = U_n^{i-1} \oplus R_n^{i-1} \oplus Y_{i+1} \\ R_n^i = Y_{i+1} \cdot [\overline{E_n^{i+1} \oplus (U_{n-1}^{i-1} \oplus R_{n-1}^{i-1})}] \oplus (U_{n-1}^{i-1} \oplus U_{n-2}^{i-1}) \cdot R_{n-1}^{i-1} \end{cases}$$

When all the rows $E_0^i$ to $E_{31}^i$ have been added (result of row 37 in FIG. 3B), it is necessary to propagate the refinements of the result obtained: rows $U_0^{15}$ to $U_{31}^{15}$ and $R_0^{15}$ to $R_{31}^{15}$ in order to obtain the product $P_0$ to $P_{31}$ when all of $R_0^i$ to $R_{31}^i$ are all zero.

To do this, and according to the embodiment of the invention more particularly described here, propagation is done with the following equations:

$$\begin{cases} U_n^i = U_n^{i-1} \oplus R_n^{i-1} \\ R_n^i = (U_{n-1}^{i-1} \oplus U_{n-2}^{i-1}) \cdot R_{n-1}^{i-1}, \end{cases}$$

that is according to EP1 (row 39).

It should be noted here that this corresponds to additions with zero rows.

Figure 3B:
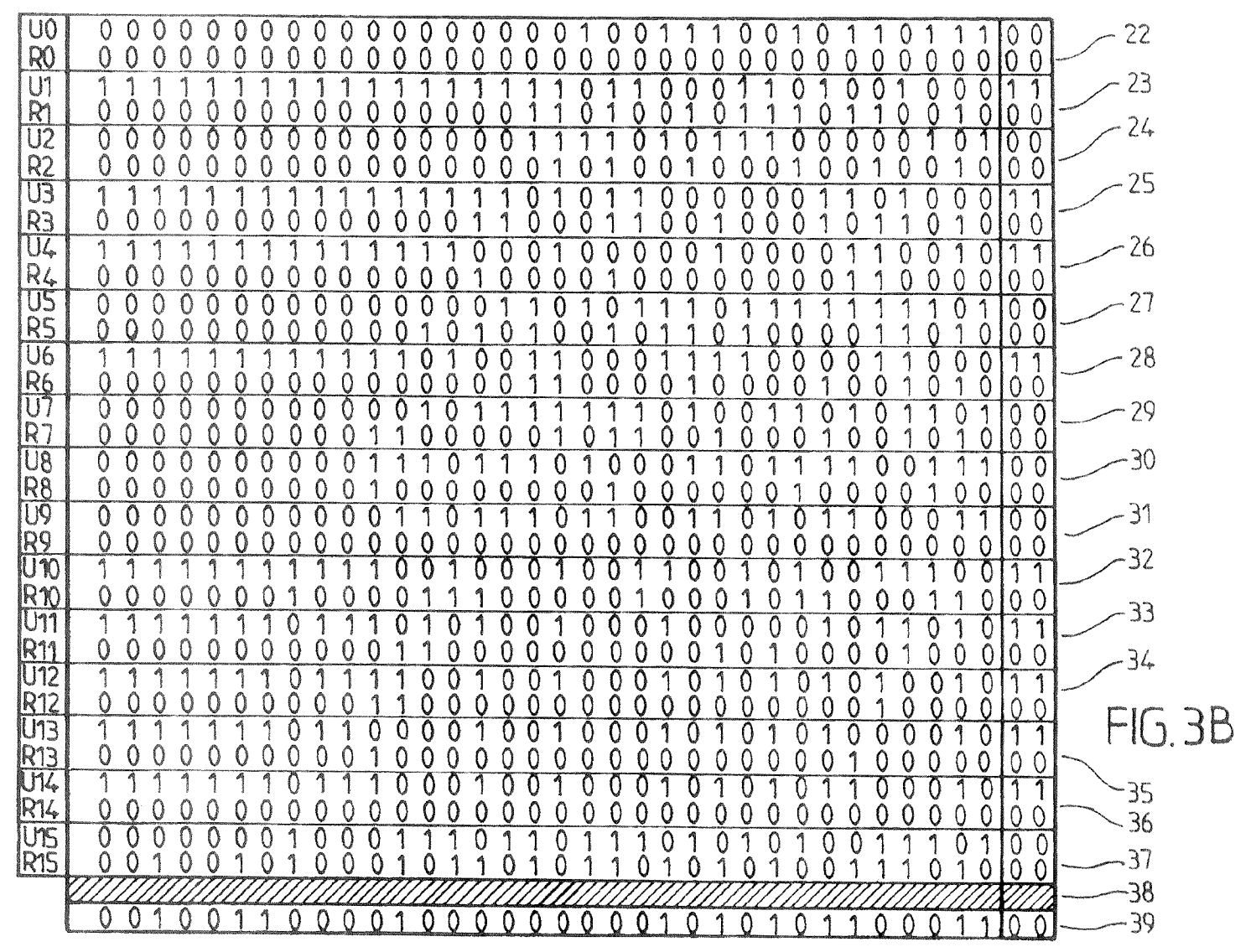

Finally the result at row 39 of FIG. 3B is obtained, reproducing the row also referenced 39 in FIG. 3A.

More precisely, and in order to show in logic circuit form the first approximation used above, it should be noted that the initial approximation $U_n^0$ and $R_{n+1}^0$ of the sum of the first two rows of the matrix is calculated with so-called "initial estimation" modules implementing the following equations:

$$\begin{cases} U_n^0 = Y_1 \oplus E_n^0 \\ R_n^0 = Y_1 \cdot (\overline{E_n^1 \oplus E_{n-1}^0}) \end{cases}$$

For implementation in modules, the signals to be generated are grouped together so as to minimise the inputs. The equations arranged by module then instead calculate $U_n^0$ and $R_{N+1}^0$ with the following initial estimation/refinement equations or formulae:

$$\begin{cases} U_n^0 = Y_1 \oplus E_n^0 \\ R_{n+1}^0 = Y_1 \cdot (\overline{E_{n+1}^1 \oplus E_n^0}) \end{cases}$$

By substituting the values $E_n^0 = (x_n \oplus y_0) \cdot Y_0$ and $E_{n+1}^1 = (x_n \oplus y_1) \cdot Y_1$ in the above equations, this gives:

$$\begin{cases} U_n^0 = Y_1 \oplus x_n \cdot Y_0 \oplus Y_0 = Y_1 \oplus Y_0 \cdot (x_n \oplus 1) = Y_1 \oplus Y_0 \cdot \overline{x_n} \\ R_{n+1}^0 = Y_1 \cdot \overline{(x_n \cdot Y_0 \oplus Y_0 \oplus x_n \cdot Y_1 \oplus y_1 \cdot Y_1 \oplus 1)} \\ \quad = Y_1 \cdot \overline{(x_n \cdot Y_0 \oplus x_n \oplus Y_0 \oplus y_1 \oplus 1)} \end{cases}$$

With: $Y_1 = y_0 \oplus y_1$ and $Y_0 = y_0$ $$\begin{cases} U_n^0 = Y_1 \oplus Y_0 \cdot \overline{x_n} \\ R_{n+1}^0 = Y_1 \cdot \overline{(x_n \cdot \overline{Y_0} \oplus y_0 \oplus y_1 \oplus 1)} = Y_1 \cdot x_n \cdot \overline{Y_0} \oplus Y_1 \cdot (\overline{y_0 \oplus y_1}) \end{cases}$$

The following is obtained:

$$\begin{cases} U_n^0 = \overline{x_n} \cdot Y_0 \oplus Y_1 \\ R_{n+1}^0 = x_n \cdot \overline{Y_0} \cdot Y_1 \end{cases}$$

This can also be expressed as:

$$\begin{cases} U_n^0 = x_n \cdot Y_0 \oplus y_1 \\ R_{n+1}^0 = x_n \cdot \overline{Y_0} \cdot y_1 \end{cases}$$

These equations are set out in diagram 40 of FIG. 8.

FIG. 9 furthermore shows an example embodiment of the estimation/propagation module (MEP) 41 implementing the equation EEP3.

The addition of the following rows of the matrix is in fact calculated with the so-called "estimation/propagation" modules implementing the following equations:

$$\begin{cases} U_n^i = U_n^{i-1} \oplus R_n^{i-1} \oplus Y_{i+1} \\ R_n^i = Y_{i+1} \cdot [\overline{E_n^{i+1} \oplus (U_{n-1}^{i-1} \oplus R_{n-1}^{i-1})}] \oplus (U_{n-1}^{i-1} \oplus U_{n-2}^{i-1}) \cdot R_{n-1}^{i-1} \end{cases}$$

As previously, the signals are grouped together in order to minimise the inputs and therefore the equations arranged by module instead calculate a system that is a function of $U_n^i$ and $R_{n+1}^i$:

$$\begin{cases} U_n^i = U_n^{i-1} \oplus R_n^{i-1} \oplus R_n^{i-1} \oplus Y_{i+1} \\ R_{n+1}^i = Y_{i+1} \cdot [\overline{E_{n+1}^{i+1} \oplus (U_n^{i-1} \oplus R_n^{i-1})}] \oplus (U_n^{i-1} \oplus U_{n-1}^{i-1}) \cdot R_n^{i-1} \end{cases} \quad \text{EEP1}$$

As regards the expression of $R_{n+1}^i$, this can be broken down as a function of the terms and $Y_{i+1}$ and $R_n^{i-1}$ as follows:

$$R_{n+1}^i = Y_{i+1} \cdot R_n^{i-1} \cdot [\overline{E_{n+1}^{i+1} \oplus (U_n^{i-1} \oplus R_n^{i-1})}] \oplus Y_{i+1} \cdot \overline{R_n^{i-1}} \cdot [\overline{E_{n+1}^{i+1} \oplus (U_n^{i-1} \oplus R_n^{i-1})}] \oplus (U_n^{i-1} \oplus U_{n-1}^{i-1}) \cdot R_n^{i-1} \cdot Y_{i+1} \oplus (U_n^{i-1} \oplus U_{n-1}^{i-1}) \cdot R_n^{i-1} \cdot \overline{Y_{i+1}}$$

Then, with grouping together of the two terms in $Y_{i+1} \cdot R_n^{i-1}$ and simplification, it becomes:

$$R_{n+1}^i = Y_{i+1} \cdot R_n^{i-1} \cdot [\overline{E_{M+1}^{i+1} \oplus (U_n^{i-1} \oplus R_n^{i-1})} \oplus U_n^{i-1} \oplus U_{n-1}^{i-1}] \oplus Y_{i+1} \cdot \overline{R_n^{i-1}} \cdot [\overline{E_{n+1}^{i+1} \oplus (U_n^{i-1} \oplus R_n^{i-1})}] \oplus (U_n^{i-1} \oplus U_{n-1}^{i-1}) \cdot R_n^{i-1} \cdot \overline{Y}$$

$R_{n+1}{}^i = \overline{Y_{i+1} \cdot R_n{}^{i-1} \cdot [E_{n+1}{}^{i+1} \oplus \overline{R_n{}^{i-1}} \oplus U_{n-1}{}^{i-1}]} \oplus Y_{i+1} \cdot$
$\overline{R_n{}^{i-1}} \cdot (E_{n+1}{}^{i+1} \oplus U_n{}^{i-1} \oplus$
$\overline{R_n{}^{i-1}}) \oplus (U_n{}^{i-1} \oplus U_{n-1}{}^{i-1}) \cdot R_n{}^{i-1} \cdot \overline{Y_{i+1}}$ $R_{n+1}{}^i = \overline{Y_{i+1} \cdot R_n{}^{i-1} \cdot (E_{n+1}{}^{i+1} \oplus U_{n-1}{}^{i-1})} \oplus Y_{i+1} \cdot$
$\overline{R_n{}^{i-1}} (E_{n+1}{}^{i+1} \oplus U_n{}^{i-1}) \oplus R_n{}^{i-1} \cdot \overline{Y_{i+1}} \cdot (U_n{}^{i-1} \oplus U_{n-1}{}^{i-1})$ A recursive equation discovered by the inventor furthermore shows that: $Y_{i+1} \cdot R_n{}^{i-1} \cdot (E_{n+1}{}^{i+1} \oplus U_{n-1}{}^{i-1}) = 0$.

The following system of equations is thus obtained:

$$\begin{cases} U_n^i = U_n^{i-1} \oplus R_n^{i-1} \oplus Y_{i+1} \\ R_{n+1}^i = Y_{i+1} \cdot \overline{R_n^{i-1}} \cdot (\overline{E_{n+1}^{i+1} \oplus U_n^{i-1}}) \oplus \overline{Y_{i+1}} \cdot R_n^{i-1} \cdot (U_n^{i-1} \oplus U_{n-1}^{i-1}) \end{cases} \text{EEP2}$$

which is the one implemented in one embodiment of the invention.

The system of equations EEP2 can also be simplified by the following transformations:

The following is written: $E_{n+1}{}^{i+1} = (x_{n-i} \oplus y_{i+1}) \cdot Y_{i+1} = e_{n+1}{}^{i+1} \cdot Y_{i+1}$ with $e_{n+1}{}^{i+1} = x_{n-i} \oplus y_{i+1}$ or in general terms $e_K{}^J = x_{K-J} \oplus y_J$.

The second equation of EEP2 is then written:

$R_{n+1}{}^i = Y_{i+1} \cdot \overline{R_n{}^{i-1}} \cdot (e_{n+1}{}^{i+1} \cdot Y_{i+1} \oplus U_n{}^{i-1}) \oplus$
$\overline{Y_{i+1}} \cdot R_n{}^{i-1} \cdot (U_n{}^{i-1} \oplus U_{n-1}{}^{i-1})$ That is:

$R_{n+1}{}^i = Y_{i+1} \cdot \overline{R_n{}^{i-1}} \cdot (e_{n+1}{}^{i+1} \oplus U_n{}^{i-1}) \oplus$
$\overline{Y_{i+1}} \cdot R_n{}^{i-1} \cdot (U_n{}^{i-1} \oplus U_{n-1}{}^{i-1})$ Factorisation of a term $(Y_{i+1} \oplus R_n{}^{i-1})$:

$R_{n+1}{}^i = Y_{i+1} \cdot (Y_{i+1} \oplus R_n{}^{i-1}) \cdot (\overline{e_{n+1}{}^{i+1} \oplus U_n{}^{i-1}}) \oplus$
$\overline{Y_{i+1}} \cdot (Y_{i+1} \oplus R_n{}^{i-1}) \cdot (U_n{}^{i-1} \oplus U_{n-1}{}^{i-1})$ By grouping together the factor term of $\overline{Y_{i+1}}$,
This gives:

$R_{n+1}{}^i = (Y_{i+1} \oplus R_n{}^{i-1}) \cdot [(e_{n+1}{}^{i+1} \oplus U_n{}^{i-1}) \oplus$
$\overline{Y_{i+1}} \cdot (e_{n+1}{}^{i+1} \oplus U_{n-1}{}^{i-1})]$ However another recursive equation discovered by the inventor furthermore shows that:

$(Y_{i+1} \oplus R_n{}^{i-1}) \cdot [\overline{Y_{i+1}} \cdot (e_{n+1}{}^{i+1} \oplus U_{n-1}{}^{i-1})] =$
$\overline{Y_{i+1}} \cdot R_n{}^{i-1} \cdot (e_{n+1}{}^{i+1} \oplus U_{n-1}{}^{i-1}) = 0$ Hence: $R_{n+1}{}^i = (Y_{i+1} \oplus R_n{}^{i-1}) \cdot (\overline{e_{n+1}{}^{i+1} \oplus U_n{}^{i-1}})$ The following system of equations is then obtained:

$$\begin{cases} U_n^i = U_n^{i-1} \oplus R_n^{i-1} \oplus Y_{i+1} \\ R_{n+1}^i = (Y_{i+1} \oplus R_n^{i-1}) \cdot (\overline{e_{n+1}^{i+1} \oplus U_n^{i-1}}) \end{cases} \text{EEP3}$$

with: $e_{n+1}{}^{i+1} = x_{n-i} \oplus y_{i+1}$
which is the one more particularly implemented in one embodiment of the invention.

As indicated above, one possible arrangement of this system 41 is shown in FIG. 9.

Several other gate arrangements are possible.
Either using the expression:

$R_{n+1}{}^i = Y_{i+1} \cdot \overline{R_n{}^{i-1}} \cdot (E_{n+1}{}^{i+1} \oplus U_n{}^{i-1}) \oplus$
$\overline{Y_{i+1}} \cdot R_n{}^{i-1} \cdot (U_n{}^{i-1} \oplus U_{n-1}{}^{i-1})$ or using the expression:

$R_{n+1}{}^i = Y_{i+1} \cdot [$
$\overline{E_{n+1}{}^{i+1} \oplus (U_n{}^{i-1} \oplus R_n{}^{i-1})}] \oplus (U_n{}^{i-1} \oplus U_{n-1}{}^{i-1}) \cdot R_n{}^{i-1}$ Finally, according to the embodiment of the invention more particularly described here, a second series of equations is used which therefore implement the equations:

$$\begin{cases} U_n^i = U_n^{i-1} \oplus R_n^{i-1} \\ R_{n+1}^i = (U_n^{i-1} \oplus U_{n-1}^{i-1}) \cdot R_n^{i-1} \end{cases} \text{EP1}$$

or $$\begin{cases} U_n^i = U_n^{i-1} \oplus R_n^{i-1} \\ R_{n+1}^i = (\overline{e_{n+1}^{i+1} \oplus U_n^{i-1}}) \cdot R_n^{i-1} \end{cases} \text{EP2}$$

For this a final propagation module (referred to as MP) (see FIG. 10) is for example implemented.

FIG. 11 shows the general diagram of a 5-bit×5-bit multiplier 43 implementing the arrangements described above according to the embodiment of the invention more particularly described. This device 43 consists of three stages:

the first stage 44 comprises a row of initial estimation modules (MI0 to MI4), the second stage 45 comprises four rows of estimation/propagation modules (MEP10 to MEP15, MEP20 to MEP26, MEP30 to MEP37, MEP40 to MEP48), the third stage 46 comprises an array of propagation modules (MPxx).

As regards the most significant bit, this is generated by an EXCLUSIVE OR cascade 47.

Finally, there is shown at 48 (FIG. 11A) the logic diagrams for obtaining the values Yi, $\overline{Y0}$ from the values $y_i$ using the EXCLUSIVE OR gates according to the advantageous embodiment of the invention.

Figure 12:
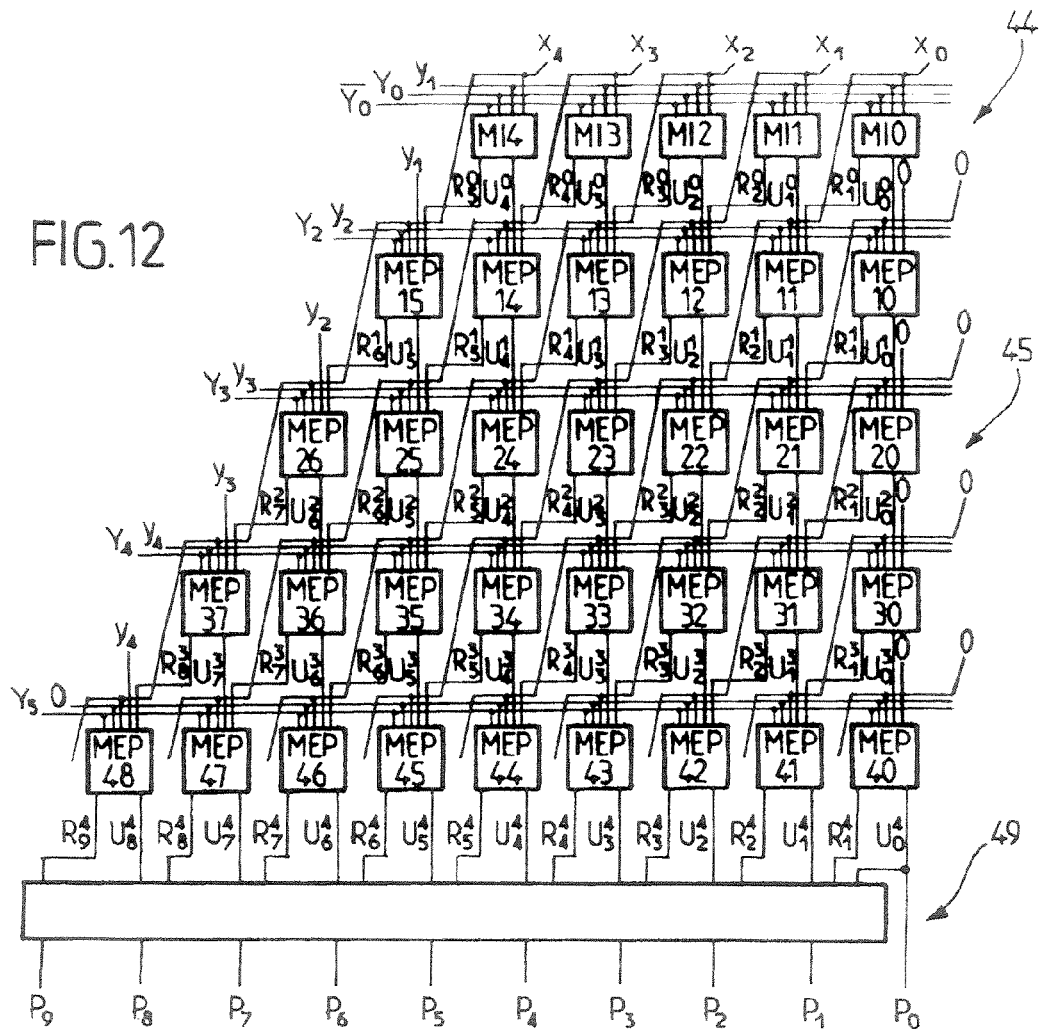
FIG. 12 shows a multiplier variant whereof the last stage is replaced by a "Carry-Look-Ahead" type stage, with a detail (FIG. 12A)
Figure 12A:
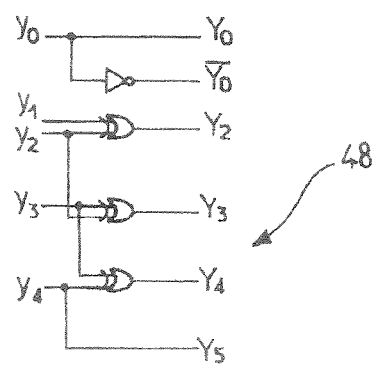

A description has also been given with reference to FIG. 12 of another embodiment of the invention using a Carry-Look-Ahead type final propagation as the third stage.

In order to reduce the propagation time, the last propagation module stage can in fact be replaced by a "Carry-Look-Ahead" type stage 49 taking as an input the form of expression in $U_n{}^{i-1}$, $U_{n-1}{}^{i-1}$ and $R_n{}^{i-1}$ or the form of expression in $U_n{}^{i-1}$, $e_{n+1}{}^{i+1}$ and $R_n{}^{i-1}$.

Here again, and as for FIG. 11A, the logic diagrams 48 have been shown using the EXCLUSIVE OR gates according to an embodiment of the invention.

Figure 13:
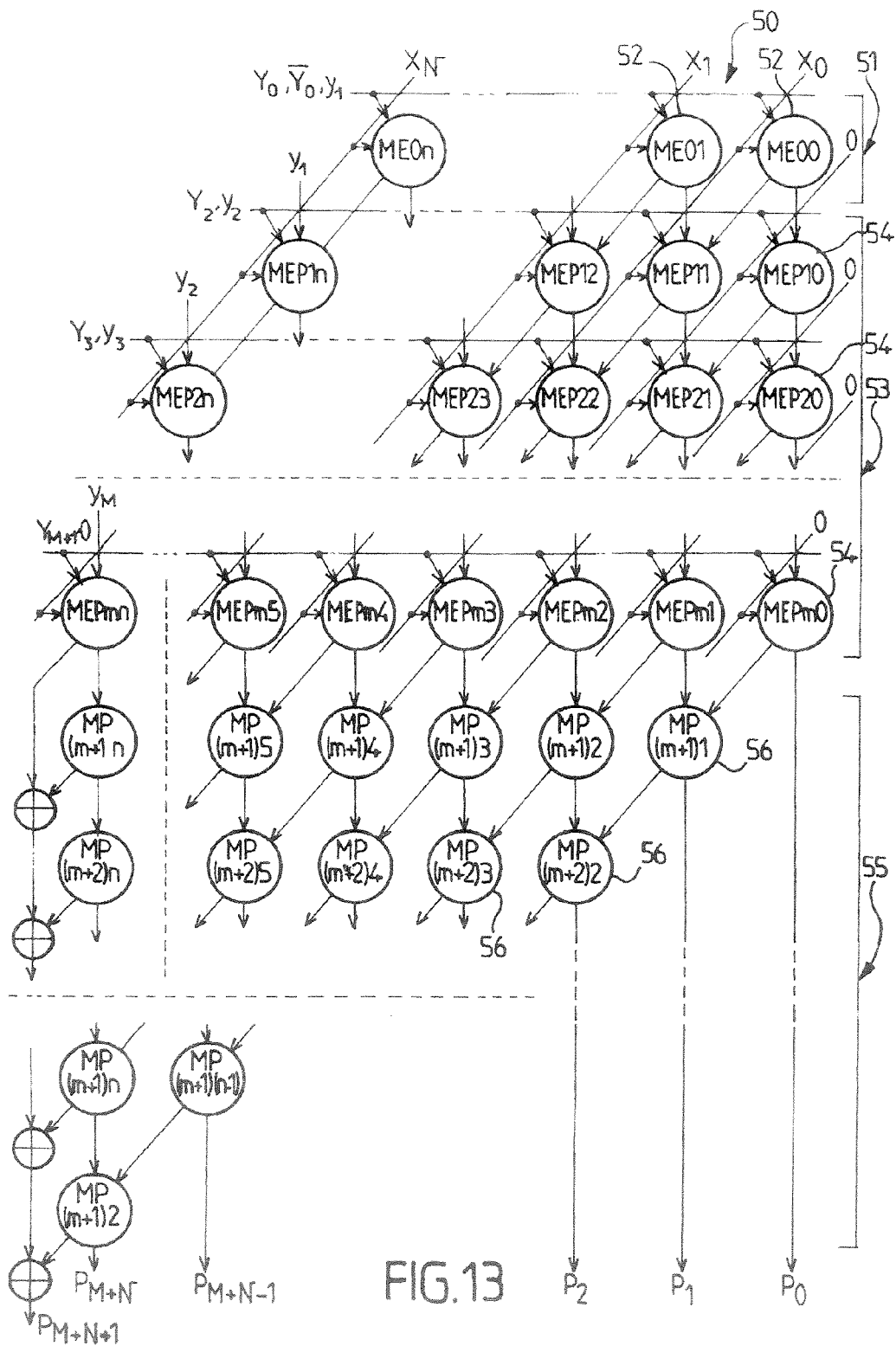
FIG. 13 gives a functional diagram of the multiplier of an embodiment of the invention more particularly described here.

As regards FIG. 13, this gives a functional description of the multiplier 50 according to the embodiment of the invention more particularly described here, showing the modularity of the structure.

A first stage 51 comprising the initial estimation modules ME0$_i$ 52 is provided, which feeds the second stage 53 of estimation and propagation modules MEP1$_i$ 54, which itself feeds the third stage 55 of propagation modules MEPmi to give the product P.

Figure 14:
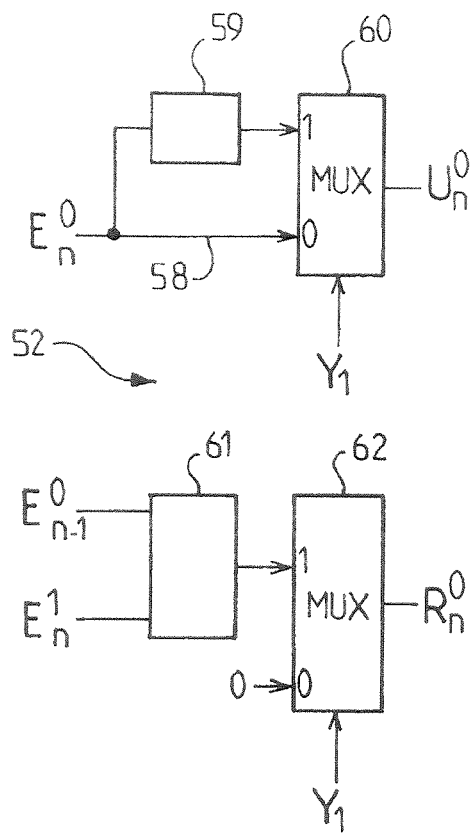
FIGS. 14 and 15 are schematic and functional representations of the steps or modules for initial estimation and estimation/propagation by virtue of the first series and/or second series of equations, according to one embodiment of the invention.
Figure 15:
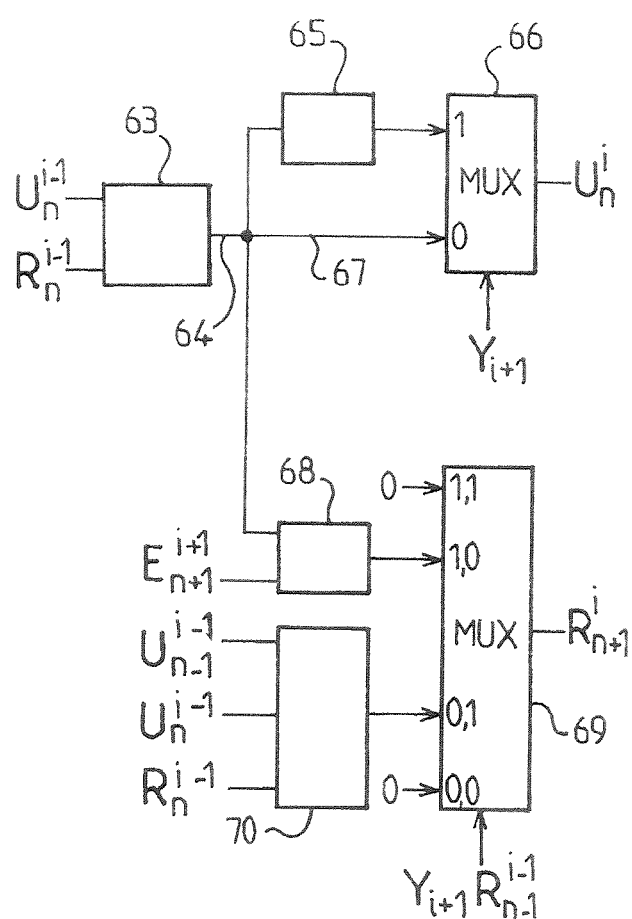

One functional interpretation of the initial estimation modules 52 and estimation/propagation modules 54 is described in FIGS. 14 and 15.

These interpretations are a function of one way of expressing the equations implemented.

Other interpretations are of course possible for other expressions of the equations.

More precisely, FIG. 14 shows the initial estimation module 52.

Using an estimation input $E_n{}^0$ which feeds a multiplexer 60, on the one hand directly (link 58) and on the other hand via an estimation calculator 59, mixing is performed with the input $y_1$, in order to obtain the initial estimate $U_n{}^0$.

As regards the carry $R_n^0$, this is obtained using the inputs $E_{n-1}^0$ and $E_n^1$ which feed a refinement calculation unit 61 as described above before activating a multiplexer 62 into which the input $y_1$ is also introduced, in order to obtain in the end the carry $R_n^0$.

As regards FIG. 15, this shows the estimation/propagation module 54 making it possible to modify the values $U_n^i$ and the carries $R_{n+1}^i$ according to an embodiment of the invention by implementing the above-mentioned algorithms.

Using the inputs $U_n^{i-1}$ and $R_n^{i-1}$ the correction in n of the values is performed (block 63) by application of the refinement.

The output 64 then feeds, on the one hand an estimation calculator 65, itself connected to the multiplexer 66, on the other hand (line 67) the same multiplexer (bit 0) into which the value $y_{i+1}$ is also introduced, and finally a refinement calculator 67. The multiplexer 66 gives the value $U_n^i$.

As regards the carry $R_{n+1}$, this is obtained by means of a multiplexer 69 fed by the values $Y_{i+1}$ and $R_{n-1}^{i-1}$ and by the output of the calculator 68, and the propagation/refinement calculation circuit 70, a circuit itself having as inputs $U_{n-1}^{i-1}$, $U_n^{i-1}$ and $R_n^{i-1}$.

As is self-evident and established by what has gone before, this invention is not limited to the embodiments more particularly described. On the contrary it encompasses all the variants thereof and in particular those where the logic circuits are constituted differently for obtaining the same result.

An embodiment of this invention provides a multiplying method and circuit satisfying practical requirements better than those known previously, in particular in that it permits a particular property not present in the prior art, on account of the intermediate expression of the number calculated in a form of approximations with successive refinements. Such a form facilitates operational tests of the proposed circuit, and for a cost in general lower and a speed at the very least equivalent.

Although the present disclosure has been described with reference to one or more examples, workers skilled in the art will recognize that changes may be made in form and detail without departing from the scope of the disclosure and/or the appended claims.

The invention claimed is:

1. A method comprising:
multiplying, using an array of adders, two binary numbers X and Y of N and M bits respectively, namely:

$$\begin{cases} X = x_N \cdot 2^N + x_{N-1} \cdot 2^{N-1} + \ldots + x_n \cdot 2^n + \ldots + x_1 \cdot 2^1 + x_0 \cdot 2^0 \\ Y = y_M \cdot 2^M + y_{M-1} \cdot 2^{M-1} + \ldots + y_n \cdot 2^n + \ldots + y_1 \cdot 2^1 + y_0 \cdot 2^0 \end{cases}$$

defining an initial matrix $[E_n^i = x_{n-i} \cdot y_i]$, wherein
the initial matrix $[E_n^i = x_{n-i} \cdot y_i]$ is transformed into a matrix $[E_n^i = (x_{n-i} \oplus y_i) \cdot (y_{i-1} \oplus y_i) = (x_{n-i} \oplus y_i) \cdot Y_i]$ with $Y_i = y_{i-1} \oplus y_i$ or $[E_n^i = e_n^i \cdot Y_i]$ with $e_n^i = x_{n-i} \oplus y_i$, wherein the step of multiplying comprises:
forming a first approximation $U_n^o$ and $R_{n+1}^0$ of a sum and carry of the first two rows $y_0$ and $y_1$ of this matrix thus transformed over the entire length of said numbers,
using this first approximation as an input for a following estimation step which is repeated for all the following rows, successively carrying out addition of the following $y_{i+1}$ rows up to the last non-zero row, according to a first given series of propagation equations,
carrying-out a propagation of the carries $R_n^{i-1}$ over the zero $y_{i+1}$ rows according to a second given series of propagation equations, in order to obtain a final result of the product P $P = p_{M+N+1} \cdot 2^{M+N+1} p_{M+N} \cdot 2^{M+N} + \ldots + p_N \cdot 2^N + \ldots + p_1 \cdot 2^1 + p_0 \cdot 2^0$.

2. The method according to claim 1, wherein the first approximation of the bits of the sum $U_n^0$ is determined by performing a calculation using a signal corresponding to the value $E_n^0$ of the matrix corrected by a signal corresponding to the value $Y_1 = y_0 \oplus y_1$,
and wherein the first approximation of the bits of the carry $R_{n+1}^0$ is determined by performing a calculation using signals corresponding to the values $E_{n-1}^0$ and $E_n^1$ of the matrix corrected by the signal corresponding to the value $Y_1 = y_0 \oplus y_1$.

3. The method according to claim 2, wherein the first approximation is given by the formulae:

$$\begin{cases} U_n^0 = y_1 \oplus y_0 \cdot x_n \\ R_n^0 = y_1 \cdot \overline{y_0} \cdot x_{n-1} \end{cases}$$

called EI1.

4. The method according to claim 3, wherein by re-expressing the first approximation as a function of $Y_1, Y_0, E_n^0, E_{n-1}^0$ the first approximation is then given by the formulae:

$$\begin{cases} U_n^0 = y_1 \oplus E_n^0 \\ R_n^0 = Y_1 \cdot (\overline{E_n^1 \oplus E_{n-1}^0}) \end{cases}$$

called E'I1
with the following carry look-ahead hypotheses: if the second row is not zero ($Y_1 = 1$), a carry is anticipated irrespective of the value of the first row ($Y_0 = 0$ or $Y_0 = 1$).

5. The method according to claim 1, wherein the first approximation is given by the formulae:

$$\begin{cases} U_n^0 = y_1 \cdot y_0 \oplus y_0 \cdot x_n \\ R_n^0 = y_1 \cdot \overline{y_0} \cdot (x_{n-1} \oplus 1) \end{cases}$$

called EI2 with: $Y_0 = 0 \oplus y_0 = y_0$ and $Y_1 = y_0 \oplus y_1$.

6. The method according to claim 5, wherein by re-expressing as a function of $Y_1, Y_0, E_n^0, E_{n-1}^0$, it becomes:

$$\begin{cases} U_n^0 = Y_1 \cdot Y_0 \oplus E_n^0 \\ R_n^0 = Y_1 \cdot (\overline{E_n^1 \oplus E_{n-1}^0}) \oplus Y_1 \cdot \overline{Y_0} \end{cases}$$

called E'I2
with the following carry look-ahead hypotheses: if the two rows are not zero ($Y_0 = 1$ and $Y_1 = 1$), a carry is anticipated.

7. The method according to claim 1, wherein the first approximation is given by the formulae:

$$\begin{cases} U_n^0 = \overline{y_0} \oplus y_0 \cdot x_n \\ R_n^0 = \overline{y_1} \cdot \overline{y_0} \oplus y_1 \cdot x_{n-1} \end{cases}$$

called EI3.

8. The method according to claim 3, characterised in that by re-expressing the first approximation as a function of $Y_1$, $Y_0$, $E_n^0$, $E_{n-1}^0$ the first approximation is given by the formulae:

$$\begin{cases} U_n^0 = 1 \oplus E_n^0 \\ R_n^0 = \overline{(E_n^1 \oplus E_{n-1}^0)} \end{cases}$$

called E'I3 with the following carry look-ahead hypotheses: irrespective of the values of $Y_0$ and $Y_1$, a carry is anticipated.

9. The method according to claim 1, wherein the first approximation is given by the formula:

$$\begin{cases} U_n^0 = y_1 \cdot \overline{y_0} \oplus y_0 \cdot x_n \\ R_n^0 = y_1 \cdot x_{n-1} \end{cases}$$

called EI4.

10. The method according to claim 1, wherein the first approximation is given by the formula:

$$\begin{cases} U_n^0 = y_1 \oplus \overline{y_1} \cdot \overline{y_0} \oplus y_0 \cdot x_n \\ R_n^0 = \overline{y_1} \cdot \overline{y_0} \oplus y_1 \cdot y_0 \cdot x_{n-1} \end{cases}$$

called EI5.

11. The method according to claim 1, wherein the first approximation is given by the formula:

$$\begin{cases} U_n^0 = \overline{y_1} \cdot \overline{y_0} \oplus y_0 \cdot x_n \\ R_n^0 = \overline{y_0} \oplus y_1 \cdot x_{n-1} \end{cases}$$

called EI6.

12. The method according to claim 1, wherein the first approximation is given by the formula:

$$\begin{cases} U_n^0 = y_0 \cdot x_n \\ R_n^0 = y_1 \cdot \overline{y_0} \oplus y_1 \cdot x_{n-1} \end{cases}$$

called EI7.

13. The method according to claim 1, wherein the first approximation is given by the formula:

$$\begin{cases} U_n^0 = y_1 \oplus \overline{y_0} \oplus y_0 \cdot x_n \\ R_n^0 = \overline{y_0} \oplus y_1 \cdot y_0 \cdot x_{n-1} \end{cases}$$

called EI8.

14. The method according to claim 1, wherein the first series of equations is written:

$$\begin{cases} U_n^i = U_n^{i-1} \oplus R_n^{i-1} \oplus Y_{i+1} \\ R_{n+1}^i = \overline{(U_{n-1}^{i-1} \oplus R_{n-1}^{i-1} \oplus E_n^{i+1})} \cdot Y_{i+1} \oplus (U_{n-1}^{i-1} \oplus U_{n-2}^{i-1}) \cdot R_{n-1}^{i-1} \end{cases}$$

called EEP1
with: $E_n^{i+1} = (x_n \oplus y_{i+1}) \cdot Y_{i+1}$ and $Y_{i+1} = y_i \oplus y_{i+1}$.

15. The method according to claim 1, wherein the first series of equations is written $$\begin{cases} U_n^i = U_n^{i-1} \oplus R_n^{i-1} \oplus Y_{i+1} \\ R_{n+1}^i = Y_{i+1} \cdot \overline{R_n^{i-1}} \cdot (\overline{E_{n+1}^{i+1} \oplus U_n^{i-1}}) \oplus \overline{Y_{i+1}} \cdot R_n^{i-1} \cdot (U_n^{i-1} \oplus U_{n-1}^{i-1}) \end{cases}$$

called EEP2.

16. The method according to claim 1, wherein the first series of equations is written:

$$\begin{cases} U_n^i = U_n^{i-1} \oplus R_n^{i-1} \oplus Y_{i+1} \\ R_{n+1}^i = (Y_{i+1} \oplus R_n^{i-1}) \cdot (\overline{e_{n+1}^{i+1} \oplus U_n^{i-1}}) \end{cases}$$

called EEP3,
with: $e_{n+1}^{i+1} = x_{n-i} \oplus y_{i+1}$.

17. The method according to claim 1, wherein the second series of equations is written:

$$\begin{cases} U_n^i = U_n^{i-1} \oplus R_n^{i-1} \\ R_{n+1}^i = (U_n^{i-1} \oplus U_{n-1}^{i-1}) \cdot R_n^{i-1} \end{cases}$$

called EP1.

18. The method according to claim 1, wherein the second series of equations is written:

$$\begin{cases} U_n^i = U_n^{i-1} \oplus R_n^{i-1} \\ R_{n+1}^i = (\overline{e_{n+1}^{i+1} \oplus U_n^{i-1}}) \cdot R_n^{i-1} \end{cases}$$

called EP2.

19. The method according to claim 1, wherein the second series of equations is performed with Carry-Look-Ahead type adders.

20. A multiplier making it possible to multiply input signals comprising a first binary number (X) and a second binary number (Y) of N and M bits respectively, namely:

$$\begin{cases} X = x_N \cdot 2^N + x_{N-1} \cdot 2^{N-1} + \ldots + x_n \cdot 2^n + \ldots + x_1 \cdot 2^1 + x_0 \cdot 2^0 \\ Y = y_M \cdot 2^M + y_{M-1} \cdot 2^{M-1} + \ldots + y_n \cdot 2^n + \ldots + y_1 \cdot 2^1 + y_0 \cdot 2^0 \end{cases}$$

defining an initial matrix $[E_n^i = x_{n-i} \cdot y_i]$,
wherein the multiplier comprises:
 calculation means for transforming the initial matrix $[E_n^i = x_{n-i} \cdot y_i]$ into a matrix $[E_n^i = (x_{n-i} \oplus y_i) \cdot (y_{i-1} \oplus y_i) = (x_{n-i} \oplus y_i) \cdot Y_i]$ with $Y_i = y_{i-1} \oplus y_i$ or $[E_n^i = e_n^i \cdot Y_i]$ with $e_n^i = x_{n-i} \oplus y_i$,
 initial approximation module arranged to provide a first approximation $U_n^0$ and $R_{n+1}^0$ of a sum and carry of the first two rows $y_0$ and $y_1$ over an entire length N of said numbers, comprising N estimation blocks connected in parallel, each estimation block being capable of performing said sums and said carries,
 estimation/propagation module arranged to successively carry out an addition of the following $y_{i+1}$ rows up to the last non-zero row, according to a first given series of propagation equations, comprising estimation/propagation blocks connected in cascade, each estimation/propagation block being capable of performing said sums and said carries, and a propagating module, propagating the carries $R_n^{i-1}$ on the zero $y_{i+1}$ rows according to a second given series of propagation equations.

21. The multiplier according to claim 20, wherein the propagating module comprises estimation blocks in inverse cascade, each estimation block being capable of performing said carries.

22. The multiplier according to claim 20, wherein the propagating module comprises, Carry-Look-Ahead type adders.

23. The multiplier according to claim 20, wherein the initial approximation module comprises means for calculating $U_n^0$ comprising an "EXCLUSIVE OR" type logic gate capable of receiving as inputs the bit corresponding to $y_1$ and a bit coming from a first "AND" logic gate producing the product of the bits $x_n$ and $Y_0$, and means for calculating the carry $R_{n+1}^0$ comprising a second "AND" type logic gate capable of receiving as inputs the bits corresponding to $y_1$, $\overline{Y_0}$ and $x_n$.

24. The multiplier according to claim 20, wherein the initial approximation module implements the formulae:

$$\begin{cases} U_n^0 = y_1 \oplus y_0 \cdot x_n \\ R_n^0 = y_1 \cdot \overline{y_0} \cdot x_{n-1} \end{cases}$$

called EI1
with $Y_1 = y_0 \oplus y_1$.

25. The multiplier according to claim 20, wherein the initial approximation module implements the formulae:

$$\begin{cases} U_n^0 = y_1 \cdot y_0 \oplus y_0 \cdot x_n \\ R_n^0 = y_1 \cdot \overline{y_0} \cdot (x_{n-1} \oplus 1) \end{cases}$$

called EI2
with: $Y_0 = 0 \oplus y_0 = y_0$ and $Y_1 = y_0 \oplus y_1$.

26. The multiplier according to claim 20, wherein the initial approximation module implements the formulae:

$$\begin{cases} U_n^0 = \overline{y_0} \oplus y_0 \cdot x_n \\ R_n^0 = \overline{y_1} \cdot \overline{y_0} \oplus y_1 \cdot x_{n-1} \end{cases}$$

called EI3.

27. The multiplier according to claim 20, wherein the estimation/propagation module arranged to successively carry out the addition of the following $y_{i+1}$ rows up to the last non-zero row implements the first series of following equations:

$$\begin{cases} U_n^i = U_n^{i-1} \oplus R_n^{i-1} \oplus Y_{i+1} \\ R_{n+1}^i = (\overline{U_{n-1}^{i-1} \oplus R_{n-1}^{i-1} \oplus E_{n-1}^{i+1}}) \cdot Y_{i+1} \oplus (U_{n-1}^{i-1} \oplus U_{n-2}^{i-1}) \cdot R_{n-1}^{i-1} \end{cases}$$

called EEP1
with: $E_n^{i+1} = (x_n \oplus y_{i+1}) \cdot Y_{i+1}$ and $Y_{i+1} = y_i \oplus y_{i+1}$.

28. The multiplier according to claim 20, wherein the estimation/propagation module arranged to successively carry out the addition of the following $y_{i+1}$ rows up to the last non-zero row implements the first series of following equations:

$$\begin{cases} U_n^i = U_n^{i-1} \oplus R_n^{i-1} \oplus Y_{i+1} \\ R_{n+1}^i = Y_{i+1} \cdot \overline{R_n^{i-1}} \cdot (\overline{E_{n+1}^{i+1} \oplus U_n^{i-1}}) \oplus \overline{Y_{i+1}} \cdot R_n^{i-1} \cdot (U_n^{i-1} \oplus U_{n-1}^{i-1}) \end{cases}$$

called EEP2.

29. The multiplier according to claim 20, wherein the estimation/propagation module arranged to successively carry out the addition of the following $y_{i+1}$ rows up to the last non-zero row implements the first series of following equations:

$$\begin{cases} U_n^i = U_n^{i-1} \oplus R_n^{i-1} \oplus Y_{i+1} \\ R_{n+1}^i = (Y_{i+1} \cdot R_n^{i-1}) \cdot (\overline{e_{n+1}^{i+1} \oplus U_n^{i-1}}) \end{cases}$$

called EEP3
with: $e_{n+1}^{i+1} = x_{n-i} \oplus y_{i+1}$.

30. The multiplier according to claim 29, wherein the estimation/propagation module arranged to successively carry out the addition of the following $y_{i+1}$ rows up to the last non-zero row comprises a circuit for calculating $U_n^i$ comprising a first "EXCLUSIVE OR" type logic gate capable of receiving as inputs the bit corresponding to $R_n^{i-1}$ and the bit corresponding to $Y_{i+1}$, said gate delivering a signal to the input of a second "EXCLUSIVE OR" type gate in order, in combination with a second input corresponding to the previously calculated bit $U_n^{i-1}$, to give the signal $U_n^i$, and means for calculating $R_{n+1}^i$ comprising a third "Inverse EXCLUSIVE OR" type gate capable of receiving as inputs the bit corresponding to $x_{n-i}$ and the bit corresponding to $y_{i+1}$, said gate delivering a signal to the input of a fourth "EXCLUSIVE OR" type gate furthermore receiving as the second input the bit corresponding to $U_n^{i-1}$, the output signals of said fourth and first "EXCLUSIVE OR" type logic gates forming the inputs of an "AND" type gate adapted to deliver the bit corresponding to the value of $R_{n+1}^i$.

31. The multiplier according to claim 20, wherein the propagating module for propagating the carries $R_n^{i-1}$ on the zero $y_{i+1}$ rows according to a second series of propagation equations implements the formulae:

$$\begin{cases} U_n^i = U_n^{i-1} \oplus R_n^{i-1} \\ R_{n+1}^i = (U_n^{i-1} \oplus U_{n-1}^{i-1}) \cdot R_n^{i-1} \end{cases}$$

called EP1.

32. The Multiplier according to claim 31, the propagating module for propagating the carries $R_n^{i-1}$ on the zero $y_{i+1}$ rows according to a second series of zero propagation equations comprises:

a circuit for calculating $U_n^i$ comprising a first «EXCLUSIVE OR" type logic gate capable of receiving as inputs the bit corresponding to $R_n^{i-1}$ and the bit corresponding to $U_n^{i-1}$ and a circuit for calculating $R_{n+1}^i$ comprising a second «EXCLUSIVE OR" type logic gate receiving as the first input the bit value corresponding to $U_n^{i-1}$ and as the second input the bit corresponding to $U_{n-1}^{i-1}$, in order to generate a signal that feeds, in combination with the bit corresponding to $R_n^{i-1}$, an "AND" logic gate adapted to give the value of $R_{n+1}^i$.

33. The multiplier according to claim 20, wherein the propagating module for propagating the carries $R_n^{i-1}$ on the zero $y_{i+1}$ rows according to a second series of propagation equations implements the formulae:

$$\begin{cases} U_n^i = U_n^{i-1} \oplus R_n^{i-1} \\ R_{n+1}^i = (\overline{e_{n+1}^{i+1} \oplus U_n^{i-1}}) \cdot R_n^{i-1} \end{cases}$$

called EP2.

* * * * *

UNITED STATES PATENT AND TRADEMARK OFFICE
CERTIFICATE OF CORRECTION

PATENT NO. : 8,468,193 B2  
APPLICATION NO. : 12/515709  
DATED : June 18, 2013  
INVENTOR(S) : Daniel Torno Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1065 days.

Signed and Sealed this  
Eighth Day of September, 2015

Michelle K. Lee  
*Director of the United States Patent and Trademark Office*

UNITED STATES PATENT AND TRADEMARK OFFICE
CERTIFICATE OF CORRECTION

PATENT NO. : 8,468,193 B2
APPLICATION NO. : 12/515709
DATED : June 18, 2013
INVENTOR(S) : Daniel Torno It is certified that error appears in the above-identified patent and that said Letters Patent is hereby corrected as shown below:

In the Specification

In Column 2, line 24, delete

" $P = p_{M+N+1} \cdot 2^{M+N+1} + p_{M+N} \cdot 2^{M+N} + \ldots + p_n \cdot 2^N + \ldots + p_1 \cdot 2^1 + p_0 \cdot 2^0$ "

and insert -- $P = p_{M+N+1} \cdot 2^{M+N+1} + p_{M+N} \cdot 2^{M+N} + \ldots + p_N \cdot 2^N + \ldots + p_1 \cdot 2^1 + p_0 \cdot 2^0$ --.

In Column 3, line 63, delete " $U_n^0 = y_1 \cdot x_n$ " and insert -- $U_n^0 = y_0 \cdot x_n$ --.

In Column 4, line 13, delete " $U_n^i = U_n^{i-1} \oplus R_n^{i-1} \oplus Y_{i+1}$ " and insert -- $U_n^i = U_n^{i-1} \oplus R_n^{i-1} \oplus Y_{i+1}$ --.

In Column 9, line 8, delete

" $R_n^i = \overline{Y_{i+1}} \cdot [(U_{n-1}^{i-1} \oplus U_{n-2}^{i-1}) \cdot R_{n-1}^{i-1}] \oplus Y_{i+1} \cdot \left[ \begin{array}{c} \overline{E_n^{i+1} \oplus (U_{n-1}^{i-1} \oplus R_{n-1}^{i-1})} \oplus \\ (U_{n-1}^{i-1} \oplus U_{n-2}^{i-1}) \cdot R_{n-1}^{i-1} \end{array} \right]$ " and insert -- $R_n^i = \overline{Y_{i+1}} \cdot [(U_{n-1}^{i-1} \oplus U_{n-2}^{i-1}) \cdot R_{n-1}^{i-1}] \oplus Y_{i+1} \cdot \left[ \overline{E_n^{i+1} \oplus (U_{n-1}^{i-1} \oplus R_{n-1}^{i-1})} \oplus (U_{n-1}^{i-1} \oplus U_{n-2}^{i-1}) \cdot R_{n-1}^{i-1} \right]$ --.

In Column 10, line 50, delete

" $U_n^i = U_n^{i-1} \oplus R_n^{i-1} \oplus R_n^{i-1} \oplus Y_{i+1}$ " and insert -- $U_n^i = U_n^{i-1} \oplus R_n^{i-1} \oplus Y_{i+1}$ --.

Signed and Sealed this
Eighth Day of March, 2016

Michelle K. Lee
*Director of the United States Patent and Trademark Office*

CERTIFICATE OF CORRECTION (continued)
U.S. Pat. No. 8,468,193 B2

In Column 10, lines 57-60, delete

" $R_{n+1}{}^i = Y_{i+1} \cdot R_n{}^{i-1} \cdot [\overline{E_{n+1}{}^{i+1} \oplus (U_n{}^{i-1} \oplus R_n{}^{i-1})}] \oplus Y_{i+1} \cdot \overline{R_n{}^{i-1}} \cdot [E_{n+1}{}^{i+1} \oplus (U_n{}^{i-1} \oplus R_n{}^{i-1})] \oplus (U_n{}^{i-1} \oplus U_{n-1}{}^{i-1}) \cdot R_n{}^{i-1} \cdot Y_{i+1} \oplus (U_n{}^{i-1} \oplus U_{n-1}{}^{i-1}) \cdot R_n{}^{i-1} \cdot \overline{Y_{i+1}}$ " and insert $$R_{n+1}^i = Y_{i+1} \cdot R_n^{i-1} \cdot \left[\overline{E_{n+1}^{i+1} \oplus \left(U_n^{i-1} \oplus R_n^{i-1}\right)}\right] \oplus Y_{i+1} \cdot \overline{R_n^{i-1}} \cdot \left[E_{n+1}^{i+1} \oplus \left(U_n^{i-1} \oplus R_n^{i-1}\right)\right]$$
$$\oplus \left(U_n^{i-1} \oplus U_{n-1}^{i-1}\right) \cdot R_n^{i-1} \cdot Y_{i+1} \oplus \left(U_n^{i-1} \oplus U_{n-1}^{i-1}\right) \cdot R_n^{i-1} \cdot \overline{Y_{i+1}}$$
--.

In Column 10, lines 65-68, delete

" $R_{n+1}{}^i = Y_{i+1} \cdot R_n{}^{i-1} \cdot [\overline{E_{M+1}{}^{i+1} \oplus (U_n{}^{i-1} \oplus R_n{}^{i-1})} \oplus U_n{}^{i-1} \oplus U_{n-1}{}^{i-1}] \oplus Y_{i+1} \cdot \overline{R_n{}^{i-1}} [E_{n+1}{}^{i+1} \oplus (U_n{}^{i-1} \oplus R_n{}^{i-1})] \oplus (U_n{}^{i-1} \oplus U_{n-1}{}^{i-1}) \cdot R_n{}^{i-1} \cdot \overline{Y}$ " and insert --
$$R_{n+1}^i = Y_{i+1} \cdot R_n^{i-1} \cdot \left[\overline{E_{n+1}^{i+1} \oplus \left(U_n^{i-1} \oplus R_n^{i-1}\right)} \oplus U_n^{i-1} \oplus U_{n-1}^{i-1}\right]$$
$$\oplus Y_{i+1} \cdot \overline{R_n^{i-1}} \cdot \left[E_{n+1}^{i+1} \oplus \left(U_n^{i-1} \oplus R_n^{i-1}\right)\right] \oplus \left(U_n^{i-1} \oplus U_{n-1}^{i-1}\right) \cdot R_n^{i-1} \cdot \overline{Y_{i+1}}$$
--.

In Column 11, lines 4-5, delete

" $R_{n+1}{}^i = Y_{i+1} \cdot R_n{}^{i-1} \cdot (E_{n+1}{}^{i+1} \oplus U_{n-1}{}^{i-1}) \oplus Y_{i+1} \cdot \overline{R_n{}^{i-1}} (E_{n+1}{}^{i+1} \oplus U_n{}^{i-1}) \oplus R_n{}^{i-1} \cdot \overline{Y_{i+1}} \cdot (U_n{}^{i-1} \oplus U_{n-1}{}^{i-1})$ " and insert --
$$R_{n+1}^i = Y_{i+1} \cdot R_n^{i-1} \cdot \left(E_{n+1}^{i+1} \oplus U_{n-1}^{i-1}\right)$$
$$\oplus Y_{i+1} \cdot \overline{R_n^{i-1}} \cdot \left(E_{n+1}^{i+1} \oplus U_n^{i-1}\right) \oplus R_n^{i-1} \cdot \overline{Y_{i+1}} \left(U_n^{i-1} \oplus U_{n-1}^{i-1}\right)$$
--.

In the Claims

In Column 14, lines 4-5, delete

" of the product P $P = p_{M+N+1} \cdot 2^{M+N+1} p_{M+N} \cdot 2^{M+N} + \ldots + p_N \cdot 2^N + \ldots + p_1 \cdot 2^1 + p_0 \cdot 2^0$. " and insert --of the product P
$$P = p_{M+N+1} \cdot 2^{M+N+1} + p_{M+N} \cdot 2^{M+N} + \ldots + p_N \cdot 2^N + \ldots + p_1 \cdot 2^1 + p_0 \cdot 2^0$$
--.

In Column 14, line 31, delete " $U_n^0 = y_1 \oplus E_n^0$ " and insert -- $U_n^0 = Y_1 \oplus E_n^0$ --.

In Column 18, lines 62-63, delete "<<EXCLUSIVE OR"" and insert --"EXCLUSIVE OR"--.

In Column 18, line 67, delete "<<EXCLUSIVE OR"" and insert --"EXCLUSIVE OR"--.